United States Patent [19]

Davie et al.

[11] Patent Number: 5,374,089
[45] Date of Patent: Dec. 20, 1994

[54] HIGH PRESSURE QUICK CONNECTOR

[75] Inventors: Robert Davie, Lapeer; David Noone, Southfield; Gary Klinger, Allen Park; Craig Cheney, Lapeer; George Szabo, Ortonville; Duane Pontbriand, Metamora; Anthony Carman, Waterford; James D. McDaniel, Ortonville, all of Mich.

[73] Assignee: ITT Industries Inc., Wilmington, Del.

[21] Appl. No.: 954,140

[22] Filed: Sep. 29, 1992

[51] Int. Cl.⁵ .................... F16L 39/02; F16L 21/00
[52] U.S. Cl. ......................... 285/317; 285/308; 285/318
[58] Field of Search ................ 285/318, 308, 317

[56] References Cited

U.S. PATENT DOCUMENTS

| | | | |
|---|---|---|---|
| 4,401,326 | 8/1983 | Blair | 285/318 |
| 4,691,943 | 9/1987 | DeLand et al. | 285/308 |
| 4,834,423 | 5/1989 | DeLand | 285/317 |
| 5,002,314 | 3/1991 | Smith | 285/318 |
| 5,094,494 | 3/1992 | McConnell | 285/318 |
| 5,096,235 | 3/1992 | Oetiker | 285/308 |
| 5,161,834 | 11/1992 | Norkey | 285/317 |

Primary Examiner—P. Austin Bradley
Assistant Examiner—Jeffrey T. Knapp
Attorney, Agent, or Firm—Robert P. Seitter; J. Gordon Lewis

[57] ABSTRACT

The present invention is a high pressure quick connector especially for use in connecting brake lines of a vehicle. The connector includes a housing which selectively receives a tube retainer cap. Retaining means such as a garter spring or snap ring allow for a low force insertion of the cap into the housing with an very high pull-off force. The cap is used to trap a tube with a bead upset, and the tube may be removed after the cap is unlocked. A second way of releasing the tube includes the use of a tube retainer plug selectively received in the cap, the upset trapped between the plug and cap. The plug can be removed while the cap is still locked in the housing, releasing the tube. A release tool may be used to unlock the cap from the housing. An insertion indicator ring is used to establish the locking of the cap within the housing. A dust boot prevents contaminants from interfering with the operation of the connector.

28 Claims, 5 Drawing Sheets

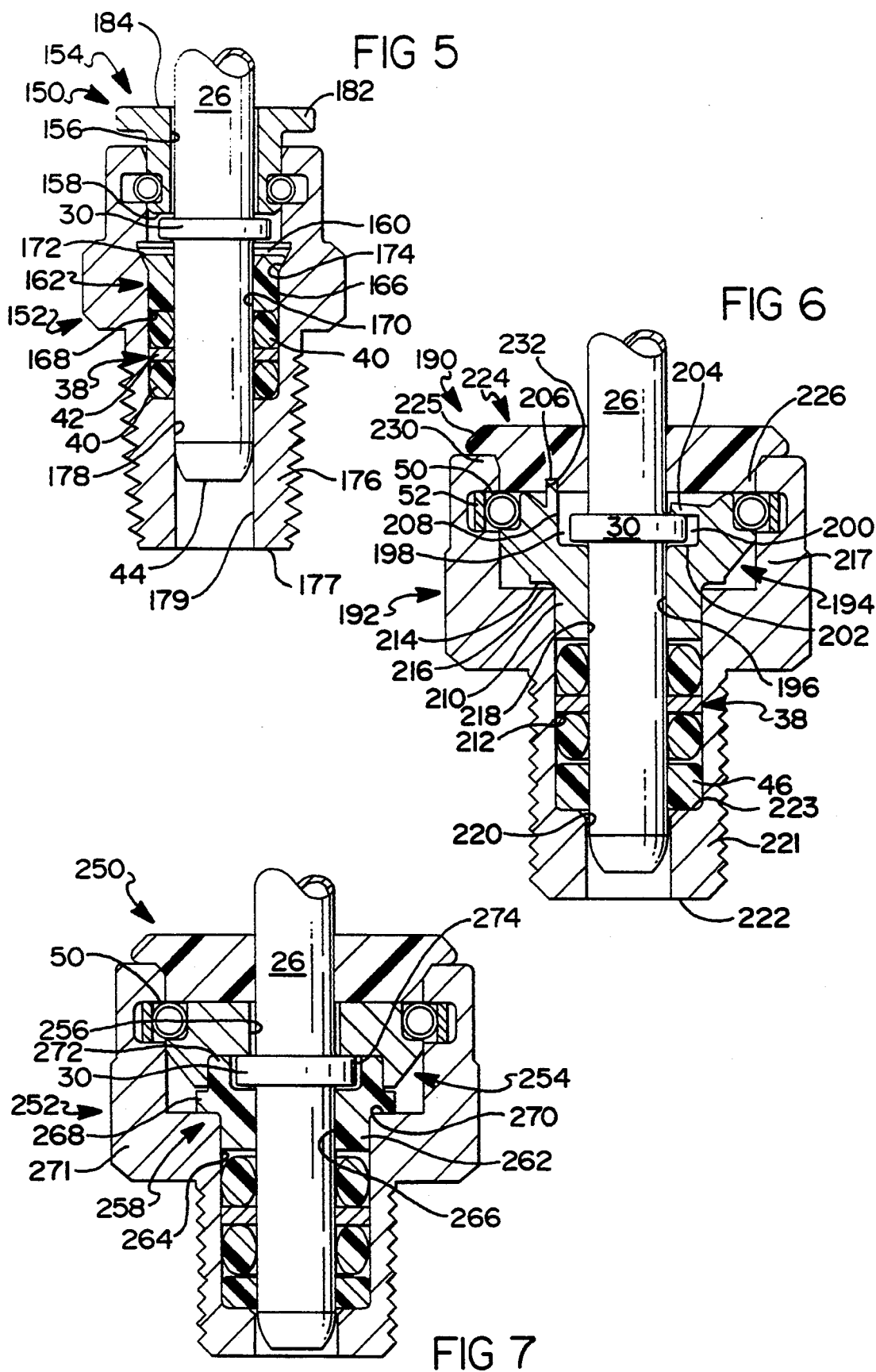

HIGH PRESSURE QUICK CONNECTOR

FIELD OF THE INVENTION

The present invention relates to high pressure quick connectors for connecting tubing sections and more particularly for connecting vehicle brake lines.

BACKGROUND OF THE INVENTION

Low cost quick connectors for connecting tubing have been widely used in automotive and non-automotive applications. Typically, they are used to connect small diameter fluid lines with low pull-off requirements.

One example of such a quick connector is known as an interference type connector. This type of connector has expandable fingers mounted in a housing that create a mechanical interference on an upset portion or bead formed on the tube to be connected. The tube and upset are inserted into the connector housing past the expandable fingers. The fingers expand to allow the upset to pass and then retract behind the bead to retain the tube within the housing. The retention or pull-off force required to separate the tube from the housing is largely dependent upon the rigidity of the expandable fingers. The greater resistance to finger expansion that is present, the more pull off force that will be required. On the other hand, the greater the rigidity of the expandable fingers, the more difficult it is to lock the tube within the housing. Further, fingers that are more rigid are more difficult to manually expand to remove the tube when removal is desired.

There are many applications which require very high pull-off forces, but low insertion forces. One such application is the connection of brake lines of a vehicle. No catastrophic failure such as bursting is permitted below 5,000 pounds per square inch. Correspondingly, low insertion forces on the order of 25 pounds are required. Because of the need for high pull-off forces and low insertion forces, typical quick connectors are unacceptable for connecting brake lines. They are also unacceptable in other applications requiring high pull-off forces and low insertion forces.

For many high pressure applications, particularly with brake lines, threaded fittings are used. Cross threading can be a problem and the torque must be gaged. Otherwise, leaking may result which has to be repaired. Further, since the threads are mated, they must be twisted together. This increases assembly time and labor while simultaneously resulting in worker fatigue. To use threaded fittings there must be sufficient space for tools such as wrenches. It is difficult to use such tools in a blind location.

It is also difficult to separate threaded fittings. Many of the problems discussed with respect to their connection are present. Further, contaminant buildup between the fittings can make separation almost impossible. Thus, servicing is very difficult.

SUMMARY OF THE INVENTION

The present invention overcomes problems with typical quick connectors by providing a high pressure quick connector which has high pull-off forces, in excess of 500 pounds. Yet, the present invention has low insertion forces, on the order of 15 pounds. Further, the present invention overcomes many of the problems associated with threaded high pressure fittings.

A disclosed high pressure connector has a housing with opposed ends, a first of these ends being flared with a recessed portion adjacent this end defining a first section. The recessed portion ends at a shoulder. A bore extends from the shoulder through a second section of the housing to a lower end. A tube retainer cap is designed to be locked within at least the recessed portion of the housing and has an aperture extending through it. A tube such as a brake line includes a bead upset formed about it. The upset is brought into selective facial contact with the cap in order to trap the tube within the housing. In order to lock the cap within the housing, retaining means are positioned between the housing and the cap within the recessed portion. Retainer acceptance means formed at an outer peripheral surface of the cap interlock with the retaining means to retain the cap in a locked position. The cap is restrained to axial movement between the housing shoulder and the retaining means.

In a preferred embodiment of the present invention, sealing means are placed in sealing contact between the housing and the outer periphery of the tube. Typically, the sealing means comprises a plurality of O-rings separated by a spacer.

Bearing means are disposed within the bore of the housing's second section in order to prevent undesirable loads, particularly lateral loads, from being applied to the sealing means. Generally, the sealing means are associated with the outer periphery of the tube. The sealing means, however, may be associated with any element, such as a portion of a cap, which is disposed within the bore. Two bearing surfaces are preferred since they stabilize the mating fitting. An upper bearing means may include a top hat element with a portion of the top hat disposed within the bore. It may also include a portion of the housing extending laterally inwardly. A lower bearing means may include a compression sleeve disposed between the sealing means on a lower end of the tube. The compression sleeve also keeps the sealing means on the tube for easier assembly. Alternatively, the second end of the housing may comprise a portion which extends laterally inwardly to act as a lower bearing means. In one disclosed embodiment, the bearing means are associated with the cap and extend laterally outwardly within the bore in order to come into contact with the housing.

An important feature of the present invention is the securement of the tube retaining cap to the housing. A preferred embodiment includes a groove with wall formed about the inner periphery of the recessed portion of the housing, the retaining means being disposed within the groove. It is preferred that the retaining means includes a garter spring, although a snap ring may be used as well. Further, a most preferred embodiment includes the use of a serpentine retainer guide disposed between the spring and wall of the groove to bias the spring outwardly of the groove and position the garter spring.

A preferred connector has a ledge formed by a flange extending outwardly of an outer peripheral surface of the cap comprising a retainer acceptance means. The garter spring comes into facial contact with the ledge to interlock the cap into the housing. The use of the disclosed retaining approach is desirable because the cap with tube is free to rotate within the housing while still being axially locked in position.

In a most preferred embodiment, the cap includes a lower conical portion which allows the gradual deformation of the garter spring in order to simplify the insertion of the cap into the housing and significantly lower the insertion forces.

The cap may be easily released from the housing. A portion of the cap may be spaced away from the recessed portion to form a recess which allows the insertion of a release tool having fingers. The fingers force the spring into the groove and away from the ledge, thus permitting the removal of the cap from the housing.

According to the present invention, the upset of the tube is in facial contact with the cap. The upset may be trapped between the cap and the top hat element. Alternatively, it may be secured within a slot of the cap. Further, a tube retainer plug may be selectively secured to the cap. The upset is trapped between the plug and cap. When the plug is removed, however, the tube with upset may be withdrawn from the housing even though the cap is still locked within the housing. Thus, a second way to release the tube from the housing is disclosed. In a preferred embodiment, the inner periphery of a portion of the cap and an outer periphery of the plug have mating threads. An aperture in the cap can be included to receive a tool in order to prevent unwanted rotation of the cap with respect to the plug when the two members are threadingly engaged and disengaged.

The connector preferably includes a "pop top" insertion indicator ring which is used to indicate when the cap is properly retained and locked within the housing. A dust hood is also disclosed in order to prevent contaminants from affecting the interlocking of the cap and housing.

The present invention has many advantages over prior art connectors. As discussed above, the connector has extremely high pull-off force while simultaneously having a low insertion force. Another component of the connector, such as the tube, is likely to fail before the garter spring fails in shear from the load exerted upon it. The disclosed connector is much easier to use than threaded fittings. No tools or twisting motion are required to lock the cap with tube into the housing. The connection can be made with limited space and in a blind location. There are no cross threading problems and no gaging of torque is required. Portions of the connector are easily removed for service and the internal components can be serviced. It is simple to release the connector using either a release tool or to unscrew the retainer plug. Through the use of the "pop top" insertion indicator ring, a secure connection is guaranteed, and no leakage testing of the connector is required.

These and other objects and advantages of the invention will be apparent after reviewing the drawings and the description thereof.

BRIEF DESCRIPTION OF THE DRAWINGS

FIG. 5 is a cross-sectional view of a second embodiment of the present invention which does not have a dust boot or permit the use of a release tool.

FIG. 6 is a cross-sectional view of a third embodiment of the present invention.

FIG. 7 is a cross-sectional view of a fourth embodiment of the present invention.

DETAILED DESCRIPTION OF THE PREFERRED EMBODIMENTS

Figures 1, 2:
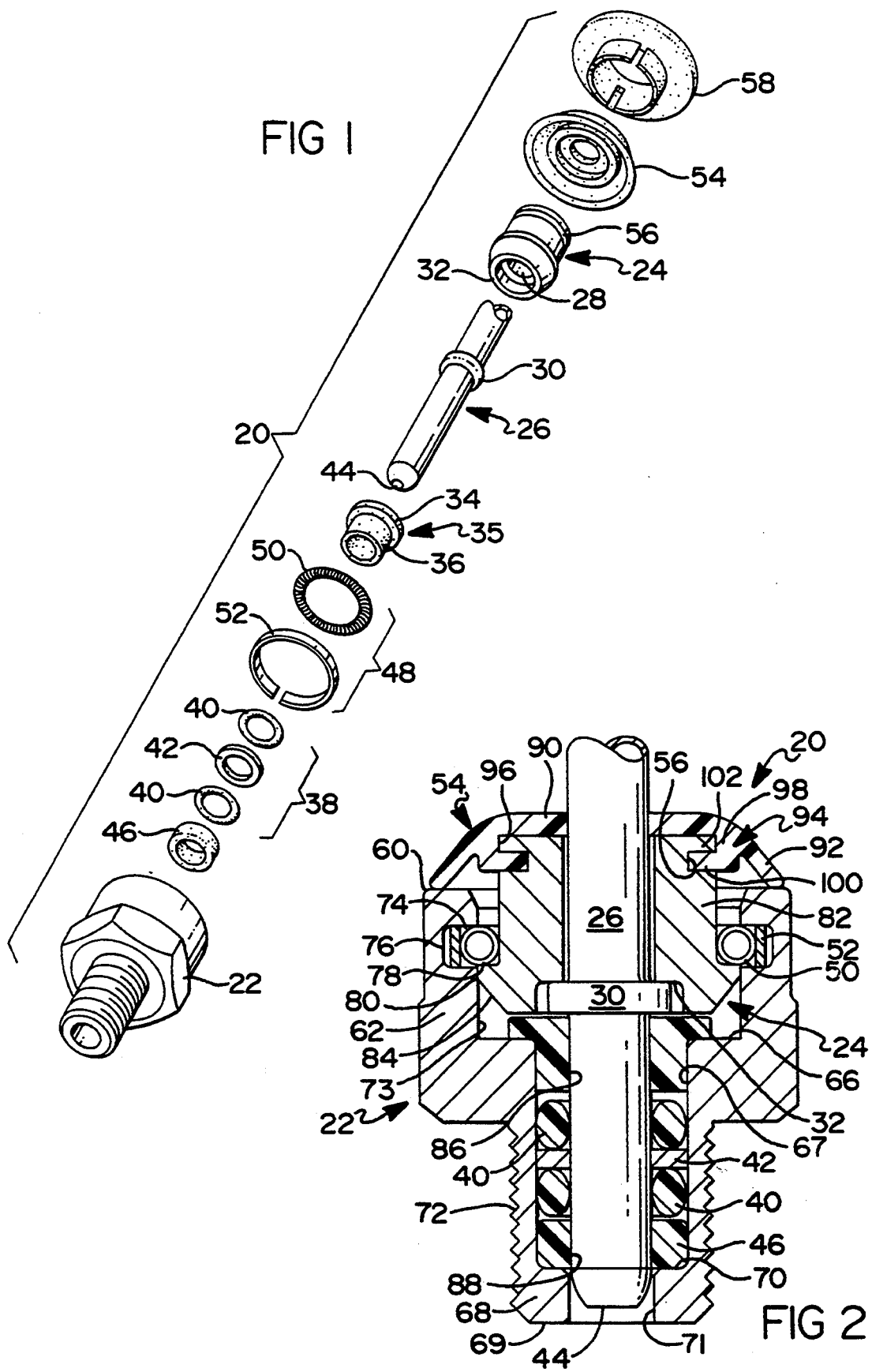
FIG. 1 is an exploded view of an embodiment of the present invention.
FIG. 2 is a cross-sectional view of the embodiment of FIG. 1.

Briefly, the quick connector 20 of FIG. 1 is adapted for connecting a tube 26 having a bead or upset 30 to a housing 22 which forms part of connector 20. The connector 20 includes a tube retainer cap 2& and a top hat element 35 which fit upon tube 26 on opposite sides of upset 30. With cap 24 and top hat 34 in place, the cap 24 can be snapped into housing 22 and locked therein by a garter spring 50. The tube 26 is then locked within housing 22. A dust cap 54 can then be snapped over cap 24 to protect the assembly from the elements and contaminants.

More particularly, connector 20 includes a housing 22 which is adapted to receive tube retainer cap 24 which has tube 26 passing through a tube retaining aperture 28 of cap 24. Bead upset 30 is formed about the outer periphery of tube 26. The use of upset 30 is preferred since less stress is placed on tube 26 than with the use of a flared end. Upset 30 is restrained to slight axial movement between a cavity 32 formed in cap 24 and a flange 34 on top hat element 35. Tube 26 passes through top hat 35. Top hat element 35 has a hollow cylindrical body 36 which extends from flange 34 and is received within housing 22 to aid in preventing lateral movement of tube 26 within housing 22. This will be discussed in greater detail below.

Sealing means 38 are provided to prevent fluid from leaking from the connector. The sealing means 38 includes two O-rings 40 separated by a spacer 42 and are positioned about the outer periphery of tube 26 between top hat 34 and a lower end 44 of tube 26 when tube 26 is inserted. Typically the O-ring is EPDM, i.e. Ethylene Propylene Diene Monomer. A compression sleeve 46 is also provided to maintain proper alignment of the seals along tube 26 when assembled.

A retaining means 48 locks the retainer cap 24 in the housing. In the disclosed embodiment, retaining means 48 is a garter spring 50 and includes a retainer guide 52 which in the preferred embodiment is serpentine. In the preferred embodiment, spring 50 is made from stainless steel and is capable of resisting high pressures in shear. A dust boot 54 is selectively snapped into a groove 56 of cap 24. Dust boot 54 prevents contaminants from interfering with the operation of connector 20, but may be removed to allow the use of a release tool 58, the operation of which is more fully discussed below.

FIG. 2 shows connector 20 in a locked position. Housing 22 has a flared end 60 with a generally cylindrical recessed portion 62 adjacent to flared end 60 which defines a first section or first bore. Recessed portion 62 ends at a shoulder 66 and a bore 67 extends from shoulder 66 into a second section of housing 22 to a lower portion 68 associated with the opposite end 69 of housing 22. Lower portion 68 includes bore 67 which extends to support surface 70 and receives the seals 40, spacer 42 and compression ring 46. Additionally, bore 67 receives the cylindrical body 36 of top hat 35. An aperture 71 extends from bore 67 and receives end 44 of tube 26. Threads 72 are provided about the outer periphery of lower portion 68 of housing 22 for the attachment of connector 20 to a mating member (not shown). Additionally, it should be understood by one of ordinary skill in the art that housing 22 would not be necessary if the lower portion various bores and shoulders were directly formed in the body to which tube 26 is to be attached.

The inner periphery 73 of recessed portion 62 includes a circular groove 74 with a back wall 76. Spring 50 is disposed within groove 74. Guide 52 is positioned between wall 76 and spring 50 to bias spring 50 outwardly of groove 74. Guide 52 is optional, but helps to position spring 50. Spring 50 is shown in retaining contact with a ledge 78 on cap 24. Ledge 78 is defined by a flange 80 extending outwardly of the outer peripheral surface of cylindrical portion 82 of cap 24. Flange 80 ends in a lower conical portion 84. Conical portion 84 allows for the gradual deformation of retaining means 50 to simplify the insertion of cap 24 into housing 22.

Instead of placing unwanted localized high pressure forces upon upset 30, it is disposed between cavity 32 and flange 34. The connector forces are instead exerted between cap 24 and housing 22 via spring 50 which is placed into shear as a result of its retaining force upon cap 34. In practice, it has been found that spring 50 is able to take so much force in shear that another portion of the connector, such as the tube, will generally fail before the connection does. Simultaneously, flange 34 of top hat 35 is in facial contact with shoulder 66 of housing 22 and cylindrical body 36 is disposed within bore 67 and abuts the wall of bore 67. Flange 34 in conjunction with shoulder 66 helps to prevent the downward axial movement of top hat 35 when force is exerted upon upset 30. Cylindrical body 36 acts as an upper bearing means 86 while cylindrical sleeve 46 acts as a lower bearing means 88. Bearing means 86 and 88 are disposed between tube 26 and the inner periphery of bore 67. They significantly lower the effects of side loads upon tube 26 and O-rings 40 and spacer 42 to avoid unwanted leakage. The use of the two bearing means also stabilizes the mating of tube 26 and housing 22 via cap 24.

Dust boot 54 includes an upper portion 90 with an outer portion 92 extending laterally outward at an angle which is in facial contact with flared end 60 of housing 22. Acceptor means 94 extend downwardly from the interface between upper portion 90 and outer portion 92 and in the disclosed embodiment is generally L-shaped. A groove 96 is formed between leg 100 of acceptor means 94 and upper portion 90. Leg 100 is selectively inserted into groove 56 of cap 24 and an upper portion 102 of cap 24 is simultaneously received within groove 96 of dust boot 54.

Figure 3:
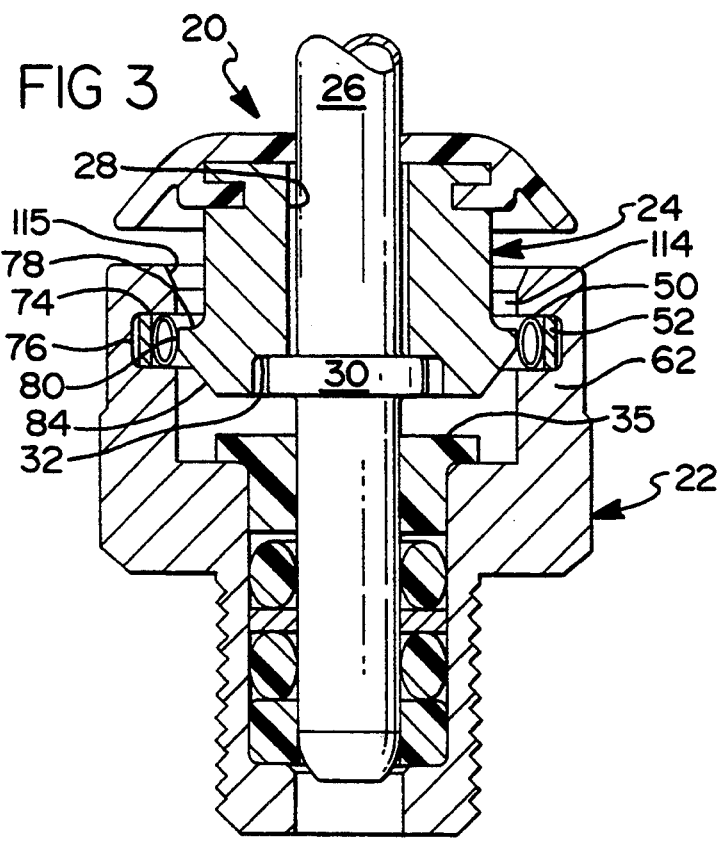
FIG. 3 is a cross-sectional view of the embodiment of FIG. 1 showing the cap as it is being inserted.

In FIG. 3, connector 20 is shown as it is being connected. Cap 24 is positioned on tube 26 on one side of upset 30 and both are then inserted into housing 22. In one method of assembly, top hat element 35, seals 40, spacers 42 and ring 46 are pre-inserted in housing 22. Cap 24 is inserted into housing 22 with upset 30 disposed between top hat 35 and lower portion 32 of cap 34. As cap 24 is inserted into housing 22, conical portion 84 gradually deforms spring 50 so that it is completely disposed within groove 74 when it comes into facial contact with flange 80. Simultaneously, retainer guide 52 is also yieldably biased toward wall 76. Once cap 24 is further lowered into housing 22, guide 52 assists to bias spring 50 outwardly into abutment with the top of ledge 78. Spring 50 rests upon ledge 78 when cap 24 is fully inserted to lock cap 24 in housing 22. Cap 24 with tube 26 is free to rotate with respect to housing 22 while still being restrained axially. Thereafter, dust boot 54 can be snapped into place.

Figure 4:
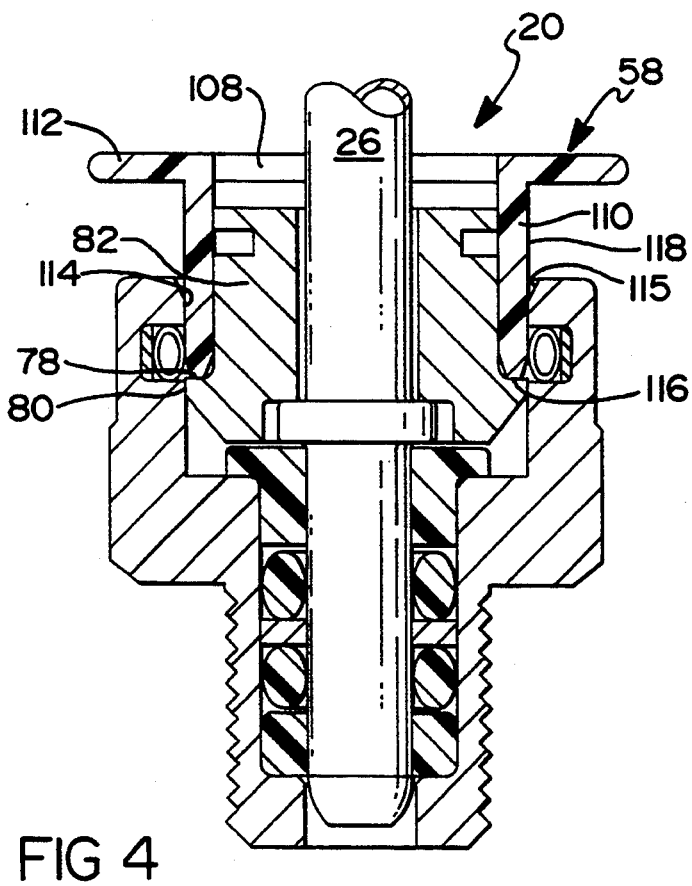
FIG. 4 is a cross-sectional view of the embodiment of FIG. 1 showing the use of a release tool to unlock the cap from the housing.

It is simple to release cap 24 from housing 22 using release tool 58, as shown in FIG. 4. Dust hood 54 has been removed. Release tool 58 has a hole 108 which is preferably slotted longitudinally so it can fit over tube 26. Tool 58 includes fingers 110 extending perpendicularly outward from an upper surface 112. Fingers 110 fit into a recess 114 formed by the outer periphery of cylindrical section 82 of cap 24 being spaced away from the inner periphery 73 of recessed portion 62. Recess 114 includes an angled upper wall 115 formed in housing 22. Recess 114 is more easily seen in FIG. 3. Wall 115 helps with the insertion of release tool 58. End 116 of fingers 110 push spring 50, which is normally resting upon ledge 78 of cap 24, against the bias of retainer guide 52 back into groove 74. The thickness of fingers 110 are such that their outer surface 118 is approximately flush with the outer edge of flange 80. As a result, spring 50 and spring retainer 52 are forced into groove 74 and cap 24 can be removed from housing 22.

A different embodiment of the present invention, a high pressure quick connector 150, is shown in FIG. 5. It includes a housing 152 adapted to receive a tube retainer cap 154 which has tube 26 passing through a tube retaining aperture 156. Upset 30 is positioned between a lower surface 158 of cap 154 and an upper surface 160 of top hat element 162. Top hat 162 includes a hollow cylindrical body 166 which is disposed within bore 168 of housing [52 and acts as an upper bearing means 170. Top hat 162 has a flange 172 which abuts a shoulder 174 formed in housing 152. Flange 172 and shoulder 174 are slightly different than flange 34 and shoulder 66 used with connector 20 in that they are slightly angled as opposed to straight, generally lateral surfaces.

Sealing means 38 comprises two O-rings 40 separated by spacer 42, all of which fit about the outer periphery of tube 26 between top hat 162 and the lower end 44 of tube 26. No compression sleeve 46 is used. Instead a lower portion 176 associated with end 177 of housing 152 extends laterally inwardly to act as a lower bearing means 178 while still leaving an aperture 179 which receives end 44 of tube 26. Simultaneously, lower portion 176 provides a support surface 180 to maintain sealing means 38 in position. Once again bearing means 170 and 178 are used to significantly lower the effects of side loads about O-rings 40 and spacer 42 to avoid unwanted leakage and provide stability.

An upper section of cap 154 of connector 150 includes a laterally outwardly extending flange 182. Flange 182 in conjunction with the lack of a recess such as recess 114 of connector 20 prevents the use of an assembly unlocking mechanism such as release tool 58. Flange 182 also protects connector 150 from contaminants so that no dust boot is required. However, if a dust boot is desired, it can be snapped onto cap 154 in the recessed space formed between flange 182 and the top of housing 152.

A different embodiment of the high pressure quick connector 190 of the present invention, is shown in FIG. 6. It includes a housing 192 adapted to receive a tube retainer cap 194 which has tube 26 passing through a tube retaining aperture 196. Upset 30 is not positioned between a lower cavity in the cap and a top hat element, however. Instead, cap 194 has an upper cavity 198 which includes a slot 200 formed between cavity base 202 and a laterally inwardly extending fingers 204 and 206. For purposes of example only, one finger 206 has been illustrated in its initial upright position. In this embodiment, tube 26 is inserted into cap 194 and then fingers 204 including finger 206 are pressed done or bent down upon upset 30. Cap 194 includes a lower cylindrical portion 210 which is disposed within bore 212 of housing ]92. A flange 214 of cap 194 is adjacent to a shoulder 216 extending laterally inwardly at the bottom of recessed portion 217 of housing 192. In conjunction with spring 50 and guide 52, the axial movement of cap 194 is restrained. The inner periphery of cylindrical portion 210 acts as an upper bearing means 218. Thus, it is possible to make a connector with fewer elements, particularly without a top hat element. Additionally, it is possible to permit assembly of the cap 194 to the tube 26 in the field if desired.

Connector 190 does include the use of a compression sleeve 46. It is not the only element of lower bearing means, 220, however. Instead, housing 192 includes a lower portion 221 associated with end 222 which extends laterally inwardly to abut the outer periphery of tube 26. Both the inner periphery of lower portion 221 and sleeve 46 act as lower bearing means 220. Bearing means 218 and 220 are used as discussed above, to lower the effects of side loads about sealing means 38 and provide stability. Lower portion 221 also provides a support surface 223 to maintain O-rings 40 and spacer 42 in position.

A different dust boot 224 is also illustrated. Dust boot 224 includes a lip 225 and cylindrical body 226 which is selectively snapped into recessed portion 228 of flared end 230 of housing 192.

A different embodiment of the present invention, a high pressure quick connector 250, is shown in FIG. 7. It includes a housing 252 adapted to receive a tube retainer cap 254 which has tube 26 passing through a tube retaining aperture 256. Top hat 258 includes a lower hollow cylindrical portion 262 which is disposed within a bore 264 of housing 252. Portion 262 acts as an upper bearing means 266. A flange 268 extends laterally outwardly from the upper section of portion 262 and rests on a shoulder 270 formed at the bottom of recessed portion 271 of housing 252. Once again, the flange and shoulder restrain the top hat when force is exerted on it by upset 30. Top hat element 258 also has an upper cylindrical portion 272 which is spaced laterally inwardly from the edge flange 268 and fitted into a cavity 274 formed in cap 254. In the preferred embodiment, cylindrical portion 272 is press fit into cavity 274. Additionally, the seals, spacers and compression ring are preferably pre-assembled to form a completely pre-assembled tube 26 that is plugged into housing 252 or a similarly configured receptacle. One of the advantages of this approach is that upset 30 is more positively locked in position between top hat 258 and cap 254 within the remaining interior of cavity 274. There is also less likelihood of lateral movement by tube 26 since it is closely confined. Still further, it is simpler to change the oil seals if necessary.

Figure 8:
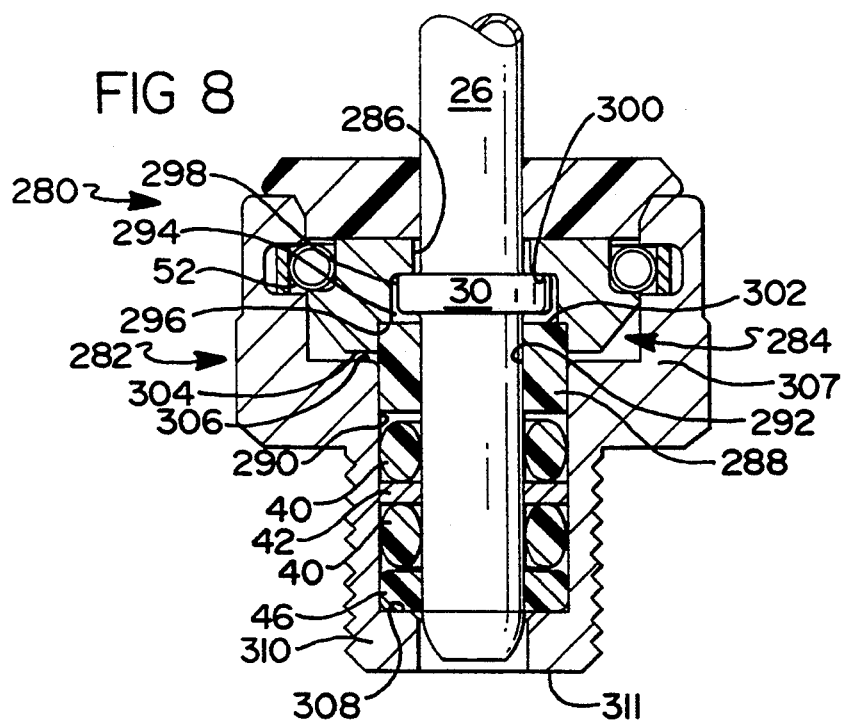
FIG. 8 is a cross-sectional view of a fifth embodiment of the present invention.

FIG. 8 shows a different way of achieving a positive lock between a top hat element and a retainer cap. High pressure connector 280 includes a housing 282 adapted to receive a tube retainer cap 284 which has tube 26 passing through a tube retaining aperture 286. Top hat 288 is simply a hollow cylindrical body. A lower section of top hat 288 fits within bore 290 of housing 282 and acts as an upper bearing means 292. The upper part of top hat 288 is preferably press fit into a counterbore 296 in cap 284. Upset 30 is constrained within cavity 298 formed within cap 284 between a lower surface 300 of cavity 298 and upper surface 302 of top hat 288. A lower surface 304 of cap 284 is adjacent to a shoulder 306 formed at the bottom of a recessed portion 307 of housing 282. Thus, the axial movement of cap 284 is restrained between shoulder 306 and spring 52. Top hat 288 is restrained to axial movement between cavity 298 and upper O-ring 40, subject to the axial compression of O-rings 40 in conjunction with support surface 308 of lower portion 310 of housing 282, and the axial stack-up of spacer 42 and compression sleeve 46. Lower portion 310 is associated with end 311 of housing 282.

Figure 9:
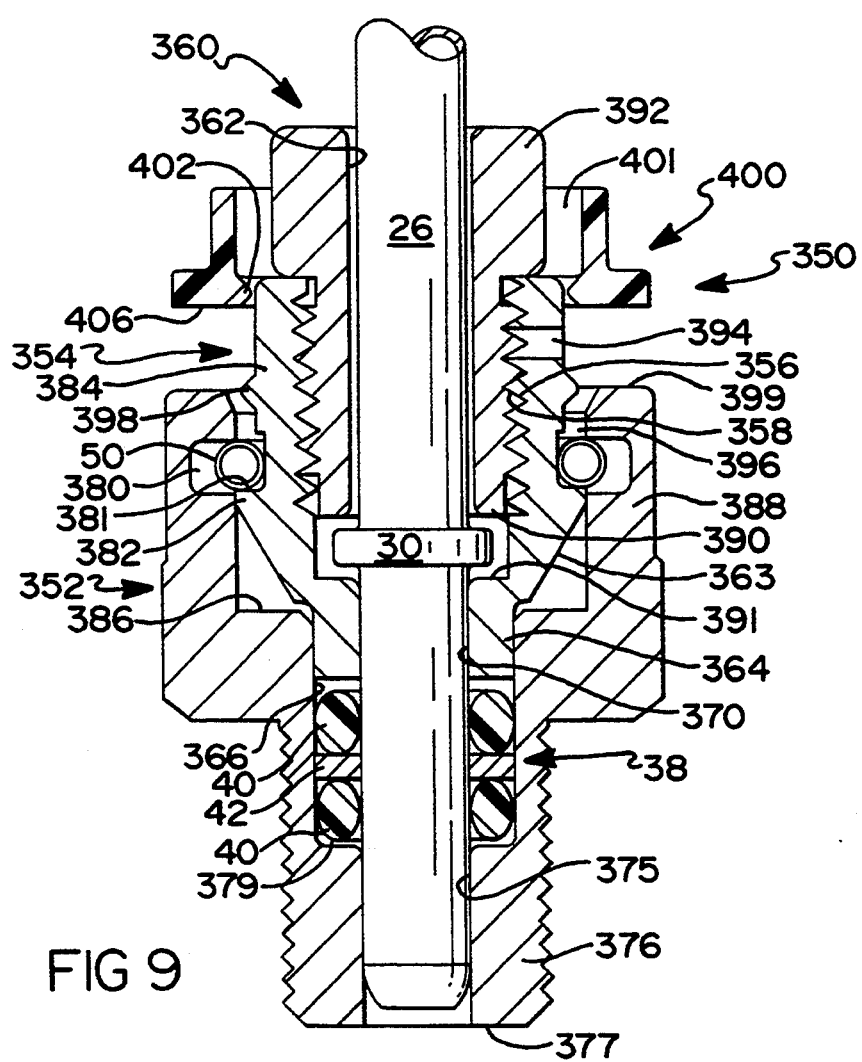
FIG. 9 is a cross-sectional view of a sixth embodiment of the present invention which also illustrates the use of a cap retainer plug and "pop top" insertion indicator ring.

The use of a dual release mechanism and a pop top insertion indicator ring are shown in FIG. 9. High pressure quick connector 350 includes a housing 352 which is adapted to receive a tube retainer cap 354. Cap 354 includes a threaded inner bore 356 for receipt of mating threads 358 of a tube retainer plug 360 which has an aperture 362 to receive tube 26.

Cap 354 includes a conical portion 363 which allows for the gradual deformation of garter spring 50 to simplify the insertion of cap 354 into housing 352. It also includes a hollow lower cylindrical portion 364 which is disposed within bore 368 of housing 352. Cylindrical portion 364 acts as an upper bearing means 370. A lower bearing means 375 is provided by a lower portion 376 associated with end 377 of housing 352 which extends laterally inwardly. Lower portion 376 also provides support surface 379 for O-rings 40 and spacer 42. As discussed above, bearing means 370 and 375 are used to significantly lower the effects of side loads about O-rings 40 and spacer 42 to avoid unwanted leakage.

Connector 350 can be locked in a manner similar to that explained above. Cap 354 is locked in place through the retaining force of garter spring 52 which is disposed within a groove 380 of housing 352. Spring 52 is shown in retaining contact with a ledge 381 formed by a flange 382 extending outwardly of the outer peripheral surface of the generally cylindrical upper portion 384 of cap 354. Downward axial movement of cap 354 is restrained by the interaction of cap 354 with a shoulder 386 formed at the bottom of recessed portion 388 of housing 352.

In this embodiment, upset 30 is trapped between a lower surface 390 of plug 360 and a shoulder 391 of cap 354. Shoulder 391 is formed between conical portion 363 and lower cylindrical portion 364 and extends laterally inwardly of the threaded inward periphery 356. If plug 360 is removed, upset 30 is no longer trapped, and tube 26 may be removed even though cap 354 is still locked in position. To threadingly mate cap 354 and plug 360, the upper portion of plug 360 comprises a nut head 392. Cap 354 has an aperture 394 extending laterally inwardly from the outer periphery which can accept a tool (not shown) which prevents the rotation of cap 354 with respect to nut head 392 when the cap and plug are threadingly engaged and disengaged.

Cap 354 can also be removed from housing 352 via release tool 58 and recess 396 formed between the inner periphery of recessed portion 382 and the outer periphery of cap 354. The method of removal is the same as that discussed with respect to FIG. 4.

The outer periphery of cap 354 includes a finger 398 extending laterally outwardly which is generally flush with flared end 399 of housing 352 when connector 350 is locked. Before cap 354 is inserted into housing 352, an insertion indicator ring 400 with a laterally inwardly extending flange 402 is placed over finger 398 so that flange 402 is in contact with the underside of finger 398. Ring 400 includes an aperture 401 so that it may fit around tube 26. When cap 354 is locked into position, flared end 399 comes into facial contact with the lower surface 406 of ring 400 and forces flange 402 over finger 398 to release flange 402. Ring 400 is then free and easily removed from the connector, as shown in the figure. It may include a notch running along its axial length so that it can be removed from tube 26. It should be appreciated that the use of ring 400 is not limited to this embodiment, but is merely being shown in this embodiment by way of example.

Figure 10:
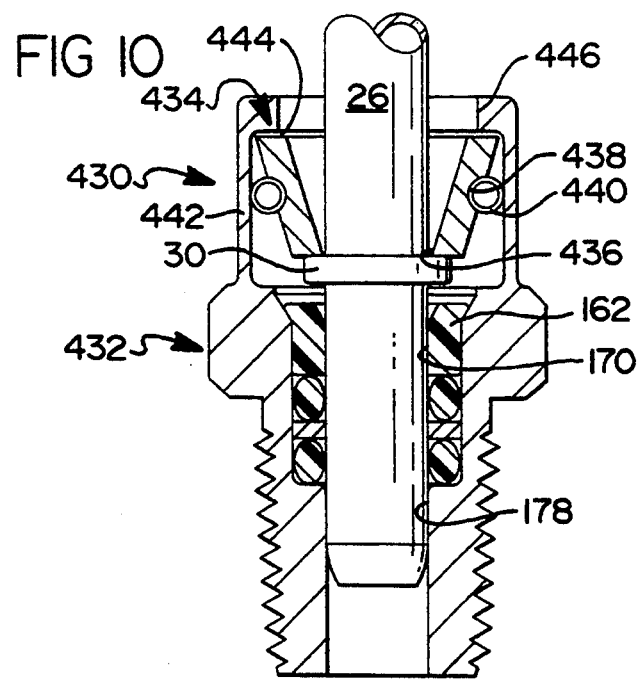
FIG. 10 is a cross-sectional view of a seventh embodiment of the present invention.

A different embodiment of the present invention, a high pressure quick connector 430, is illustrated in FIG. 10. It includes a housing 432 adapted to receive a tube retainer cap 434 which has an aperture 436 to receive tube 26. Cap 434 has a generally conical shape with a groove 438 about its outer periphery for receiving a garter spring 440. When cap 434 is locked into position, spring 440 is adjacent the inner periphery of a recessed portion 442 of housing 432 and disposed in groove 438. The upper end 444 of cap 434 is restrained from axial movement upwardly by laterally inwardly extending flared end 446 of housing 432. Upset 30 is restrained between the lower end 448 of cap 434 and top hat element 162. Bearing means 170 and 178 are the same as discussed above with respect to the embodiment of FIG. 5. As can be appreciated, cap 434 expands slightly adjacent end 448 as tube 26 is inserted to receive upset 30. Once upset 30 is beyond end 448 the cap 434 retracts to lock tube 26 in the housing 432. A release tool, not shown, could be used to release tube 26. The tool would be dimensioned to spread the bottom of cap 434 sufficiently to allow upset 30 to pass.

Figure 11:
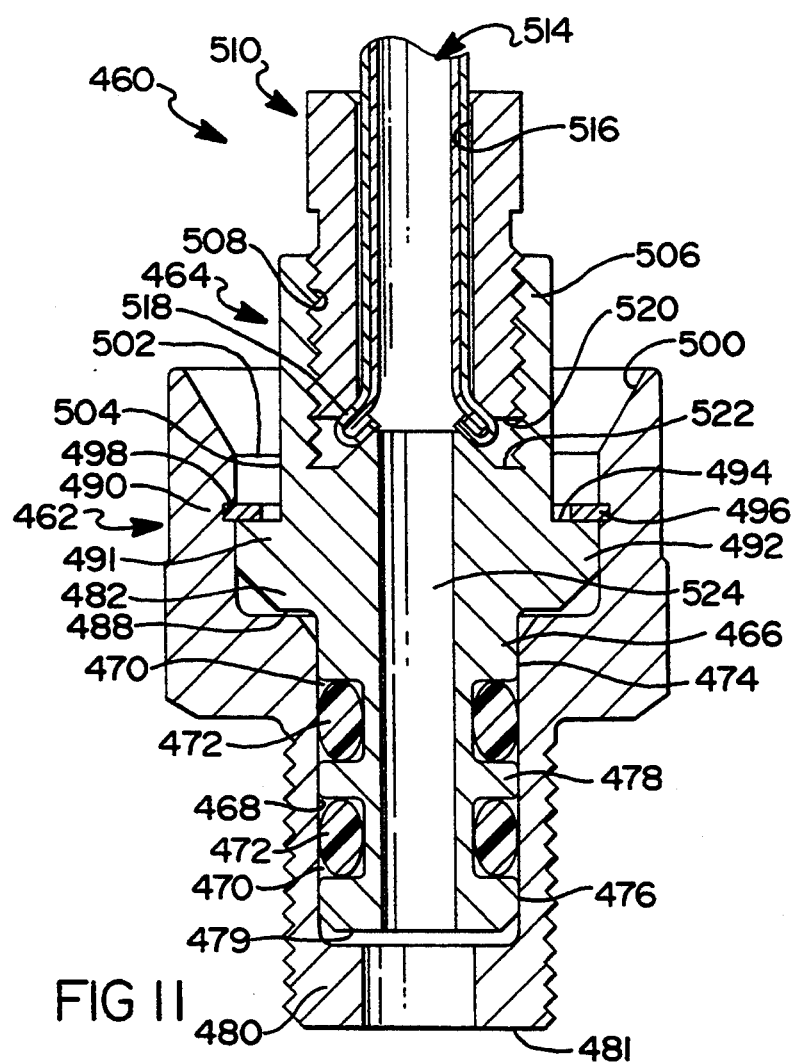
FIG. 11 is a cross-sectional view of an eight embodiment of the present invention.

A different embodiment of the present invention, a high pressure connector 460, is shown in FIG. 11. It includes a housing 462 adapted to receive a tube retainer cap 464. Cap 464 has a lower cylindrical portion 466 which is received within a bore 468 of housing 462. Cylindrical portion 466 includes two laterally inwardly extending grooves 470 which each receive an O-ring 472. Undesirable side loading upon O-rings 472 is prevented by the outer periphery of cylindrical portion 466, which has an upper bearing means 474 and a lower bearing means 476. The section of cylindrical portion 466 between grooves 470 acts as a spacer 478. The bottom surface 479 of cap 464 is adjacent a laterally inwardly extending lower portion 480 associated with end 481 of housing 462. A ledge 482 extends laterally outwardly from the upper end of portion 466 and is adjacent a shoulder 488 formed at the bottom of recessed portion 490 of housing 462. Cap 464 also has a central portion 491 with a laterally outwardly extending flange 492 which includes a ledge 494. A snap ring retainer 496 is selectively positioned within a groove 498 formed within recessed portion 490 of housing 462 and adjacent to ledge 494. In the shown locked position, cap 464 is restrained to axial movement between the underside of snap ring 496 and shoulder 488. The upper section of recessed portion 490 includes two walls 500 extending laterally outward at an angle. This allows easier access for a snap ring tool (not shown) into a recess 502 formed between the inner periphery of recessed portion 490 and an outer periphery 504 of cap 464 to place or remove snap ring 496 and in turn lock or unlock cap 464 from housing 462.

Cap 464 includes an upper cylindrical portion 506 with a threaded bore 508. A mating tube retainer plug 510 has a threaded outer periphery 512 which matingly threads with inner periphery 508. A tube 514 passes though an aperture 516 of plug 510 with a flared end upset 518 extending outwardly of the lower surface 520 of plug 506. Upset 518 is restrained between lower surface 520 and an upper surface 522 of central portion 491. Upper surface 522 of portion 491 and lower surface 520 of plug 506 are selectively angled to correspond to the angle of upset 518 with respect to the axial axis in order to provide a tight connection for tube 514.

Connector 460 has a dual release mechanism. Either cap 464 can be removed from housing 462, or tube 514 can be removed from cap 464 by threadingly disengaging plug 506 from cap 464.

Since tube 514 does not pass through substantially the entirety of housing 462, an aperture 524 starts at the lower surface 522 of central portion 491 and extends axially through the lower cylindrical portion 466. An aperture 528 is formed through lower portion 480 of housing 462.

Preferred embodiments have been disclosed. A worker of ordinary skill in the art would realize, however, that certain modifications would come within the teaching of this invention. Therefore, the following claims should be studied in order to determine the true scope and content of the invention.

We claim:
1. A high pressure quick connector comprising:
a housing with opposed ends, a first bore extending from said first end defining a first section, said first bore ending at a shoulder, a second bore extending from said shoulder into a second section toward a second of said ends;
a tube having an inner end adapted for insertion into said housing, an upset being formed about said tube;
a tube retainer cap disposed within at least said first section and having an aperture extending through said cap, said cap being in selective facial contact with said upset in order to trap said tube within said housing;
retaining means positioned between said housing and said cap within said first section;
sealing means disposed within at least one of said first bores and said second bores to prevent leakage;
bearing means disposed within said bore to protect said sealing means from damaging forces;
said cap and tube being retained within said housing as said retaining means interlocks said housing to a retainer acceptance means formed at an outer peripheral surface of said cap; and
wherein said cap includes a conical portion, said conical portion allowing the gradual deformation of said retaining means to facilitate the insertion of said cap into said first section.

2. A connector as recited in claim 1, wherein said cap includes a section adapted to selectively receive a tube retainer plug, said tube passing through said tube retainer plug with said upset trapped between said plug and said cap.

3. A connector as recited in claim 1, wherein a dust boot is selectively disposed between said first end of said housing and said cap to prevent contaminants from affecting the operation of the connector.

4. A connector as recited in claim 1, wherein a groove is formed about an inner periphery of said first section to selectively receive said retaining means.

5. A connector as recited in claim 4, wherein said retaining means comprises a garter spring.

6. A connector as recited in claim 4, wherein a portion of said cap is spaced away from said recessed portion to form a recess which allows access to said retaining means for separation of said retaining means from said retainer acceptance means.

7. A high pressure quick connector comprising:
a housing with opposed ends, a recessed portion adjacent said first end defining a first section, said recessed portion ending at a shoulder, a bore extending from said shoulder into a second section of said housing toward a second of said ends;
a tube, a lower end of said tube adapted for insertion into said housing, an upset being formed about an outer periphery of said tube;
a tube retainer cap adapted to be inserted into said recessed portion and having an aperture extending longitudinally through said cap, said cap being in selective facial contact with said upset in order to trap said tube within said housing;
sealing means in sealing contact with said housing within said bore of said second section;
bearing means disposed within said bore to protect said sealing means from damaging forces, said bearing means being adjacent said sealing means;
retaining means positioned between said housing and adapted to engage said cap within said first section to lock said cap and said tube within said housing;
said cap being retained within said first section as said retaining means interlocks said housing to a retainer acceptance means formed on an outer peripheral surface of said cap; and
wherein said cap includes a conical portion allowing the gradual deformation of said retaining means to simplify the insertion of said cap into said housing.

8. A connector as recited in claim 7, wherein said retainer acceptance means comprises a ledge formed by a flange extending outwardly of an outer peripheral surface of said cap, said retaining means coming into facial contact with said ledge when said cap is interlocked into said housing by said retaining means.

9. A connector as recited in claim 7, wherein a dust boot is selectively disposed between said first end of said housing and said cap to prevent the undesirable accumulation of contaminants which can interfere with connector operation.

10. A connector as recited in claim 7, wherein said bearing means includes an upper bearing means disposed adjacent said shoulder within said bore of said second section.

11. A connector as recited in claim 10, wherein said upper bearing means comprises a top hat element with a hollow portion of said top hat element disposed within said bore of said second section.

12. A connector as recited in claim 7, wherein said bearing means includes a lower bearing means disposed at said second of said ends of said housing.

13. A connector as recited in claim 12, wherein said lower bearing means includes a compression sleeve disposed between said sealing means and said lower end of said tube.

14. A connector as recited in claim 7, wherein a groove is formed about an inner periphery of said recessed portion, said retaining means disposed within said groove.

15. A connector as recited in claim 14, wherein said retaining means includes a garter spring.

16. A connector as recited in claim 14, wherein a retainer guide is selectively disposed between said spring and said wall of said groove to bias said spring outwardly of said groove.

17. A connector as recited in claim 14, wherein a portion of said cap is spaced away from said first end and said recessed portion of said housing to form a recess which allows the insertion of a release tool having fingers, said fingers forcing said spring into said groove and away from said retainer acceptance means, thus permitting the separation of said cap from said housing.

18. A high pressure quick connector comprising:
a housing with opposed ends, a first of said ends being flared, a recessed portion adjacent said first end defining a first section, said recessed portion ending at a shoulder, said shoulder extending laterally inwardly of an inner periphery of said recessed portion, a bore extending from the lateral inward edge of said shoulder into a second section of said housing toward a second of said ends, a groove with wall formed about said inner periphery of said recessed portion;
a tube having a lower end adapted for insertion into said housing, an upset being formed about an outer periphery of said tube;
a tube retainer cap disposed within at least said recessed portion and having an aperture extending through said cap, said upset being in selective facial contact with said upset in order to trap said tube within said housing;
sealing means disposed within said bore in sealing contact between said housing and one of said tube and said cap;
axially spaced upper and lower bearing means disposed within said bore adjacent said sealing means and said housing to prevent damaging forces from being applied to said sealing means;
biasing means disposed within said groove between said recessed portion and said cap; and
said cap being retained within said recessed portion as a spring within said groove interlocks said housing to a ledge formed by a flange extending outwardly of an outer peripheral surface of said cap.

19. A connector as recited in claim 18, wherein a retainer guide is selectively disposed between said biasing means and said wall of said groove to bias said biasing means outwardly of said groove.

20. A connector as recited in claim 18, wherein said sealing means comprises two O-rings and a spacer separating said O-rings, said O-rings and said spacer disposed about said outer periphery of said tube between said upset and said lower end of said tube.

21. A connector as recited in claim 18, wherein a finger extends about said cap with an insertion indicator ring having an inwardly extending flange disposed about a section of said finger until said cap is locked within said housing.

22. A connector as recited in claim 18, wherein a portion of said cap is spaced away from said inner periphery of said recessed portion to form a recess which allows the insertion of a release tool having fingers, said fingers forcing said biasing means into said groove and away from said ledge of said flange of said cap, thus permitting the separation of said cap from said housing.

23. A connector as recited in claim 18, wherein said cap includes a cylindrical portion formed to selectively accept a tube retainer plug, said upset being trapped between said cap and said plug when said plug is secured to said cap.

24. A high pressure quick connector comprising:
a housing with opposed ends, a recessed portion adjacent said first end defining a first section, said recessed portion ending at a shoulder, a bore extending from said shoulder into a second section of said housing toward a second of said ends;
a tube, a lower end of said tube adapted for insertion into said housing, an upset being formed about an outer periphery of said tube;
a tube retainer cap adapted to be inserted into said recessed portion and having an aperture extending longitudinally through said cap, said cap being in selective facial contact with said upset in order to trap said tube within said housing;
sealing means in sealing contact with said housing within said bore of said second section;
bearing means disposed within said bore to protect said sealing means from damaging forces, said bearing means being adjacent said sealing means;
retaining means positioned between housing and adapted to engage said cap within said first section to lock said cap and said tube within said housing;
said cap being retained within said first section as said retaining means interlocks said housing to a retainer acceptance means formed on an outer peripheral surface of said cap;
wherein said bearing means includes a lower bearing means disposed at said second of said ends of said housing; and
wherein said lower bearing means includes a compression sleeve disposed between said sealing means and said lower end of said tube.

25. A high pressure quick connector comprising:
a housing with opposed ends, a recessed portion adjacent said first end defining a first section, said recessed portion ending at a shoulder, a bore extending from said shoulder into a second section of said housing toward a second of said ends;
a tube, a lower end of said tube adapted for insertion into said housing, an upset being formed about an outer periphery of said tube;
a tube retainer cap adapted to be inserted into said recessed portion and having an aperture extending longitudinally through said cap, said cap being in selective facial contact with said upset in order to trap said tube within said housing;
sealing means in sealing contact with said housing within said bore of said second section;
bearing means disposed within said bore to protect said sealing means from damaging forces, said bearing means being adjacent said sealing means;
retaining means positioned between said housing and adapted to engage said cap within said first section to lock said cap and said tube within said housing;
said cap being retained within said first section as said retaining means interlocks said housing to a retainer acceptance means formed on an outer peripheral surface of said cap;
wherein a groove is formed about an inner periphery of said recessed portion, said retaining means disposed within said groove; and
wherein said retaining means includes a garter spring.

26. A high pressure quick connector comprising:
a housing with opposed ends, a recessed portion adjacent said first end defining a first section, said recessed portion ending at a shoulder, a bore extending from said shoulder into a second section of said housing toward a second of said ends;
a tube, a lower end of said tube adapted for insertion into said housing, an upset being formed about an outer periphery of said tube;
a tube retainer cap adapted to be inserted into said recessed portion and having an aperture extending longitudinally through said cap, said cap being in selective facial contact with said upset in order to trap said tube within said housing;
sealing means in sealing contact with said housing within said bore of said second section;
bearing means disposed within said bore to protect said sealing means from damaging forces, said bearing means being adjacent said sealing means;
retaining means positioned between said housing and adapted to engage said cap within said first section to lock said cap and said tube within said housing;
said cap being retained within said first section as said retaining means interlocks said housing to a retainer acceptance means formed on an outer peripheral surface of said cap; and
wherein said retainer acceptance means comprises a ledge formed by a flange extending outwardly of an outer peripheral surface of said cap, said retaining means coming into facial contact with said ledge when said cap is interlocked into said housing by said retaining means.

27. A high pressure quick connector comprising:
a housing with opposed ends, a first bore extending from said first end defining a first section, said first bore ending at a shoulder, a second bore extending from said shoulder into a second section toward a second of said ends;
a tube having an inner end adapted for insertion into said housing, an upset being formed about said tube;
a tube retainer cap disposed within at least said first section and having an aperture extending through said cap, said cap being in selective facial contact with said upset in order to trap said tube within said housing;
retaining means positioned between said housing and said cap within said first section;
sealing means disposed within at least one of said first bores and said second bores to prevent leakage;
bearing means disposed within said bore to protect said sealing means from damaging forces;
said cap and tube being retained within said housing as said retaining means interlocks said housing to a retainer acceptance means formed at an outer peripheral surface of said cap;

wherein a groove is formed about an inner periphery of said first section to selectively receive said retaining means, wherein said retaining means comprises a garter spring.

28. A high pressure quick connector comprising:
a housing with opposed ends, a first bore extending from said first end defining a first section, said first bore ending at a shoulder, a second bore extending from said shoulder into a second section toward a second of said ends;
a tube having an inner end adapted for insertion into said housing, an upset being formed about said tube;
a tube retainer cap disposed within at least said first section and having an aperture extending through said cap, said cap being in selective facial contact with said upset in order to trap said tube within said housing;
retaining means positioned between said housing and said cap within said first section;
sealing means disposed within at least one of said first bores and said second bores to prevent leakage;
bearing means disposed within said bore to protect said sealing means from damaging forces;
said cap and tube being retained within said housing as said retaining means interlocks said housing to a retainer acceptance means formed at an outer peripheral surface of said cap;
wherein a groove is formed about an inner periphery of said first section to selectively receive said retaining means; and
wherein a portion of said cap is spaced away from said recessed portion to form a recess which allows access to said retaining means for separation of said retaining means from said retainer acceptance means.

* * * * *